Jan. 24, 1928. 1,657,328
W. THOMAS
MACHINE FOR PRODUCING VARYING TOOTH COMBINATIONS ON TYPOGRAPHICAL ELEMENTS
Filed Feb. 16, 1922 6 Sheets-Sheet 4
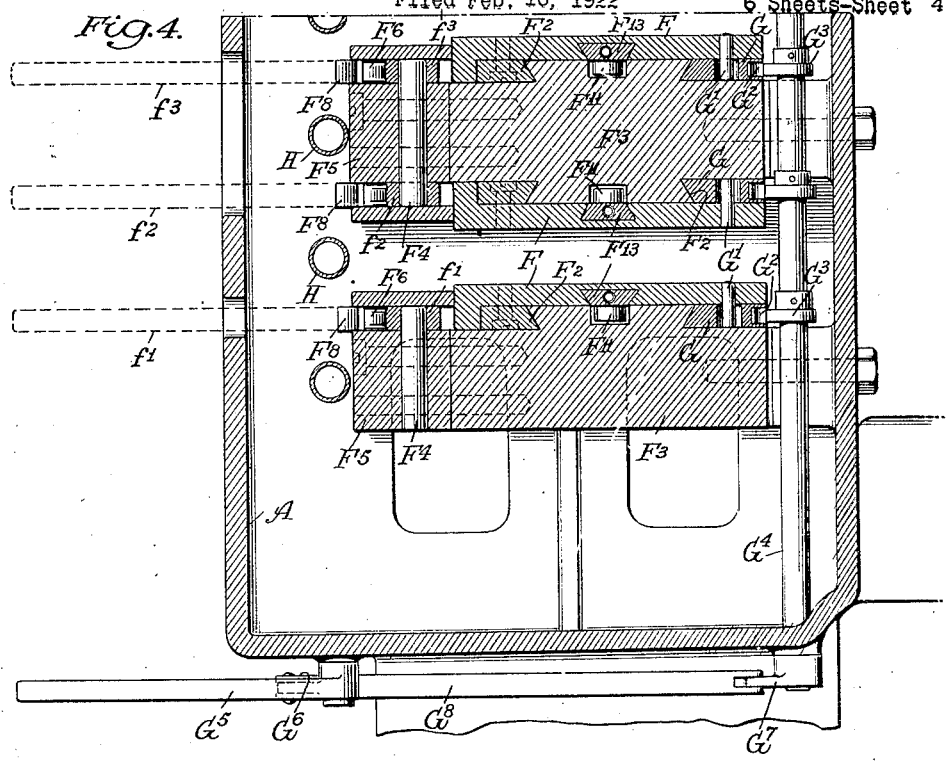
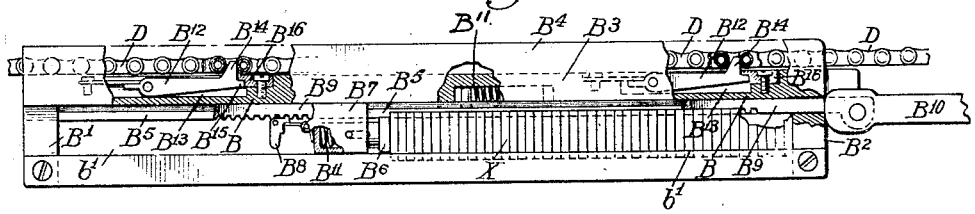
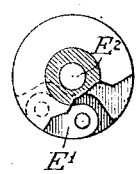
INVENTOR
BY William Thomas
Rogers Kennedy Campbell ATTORNEYS

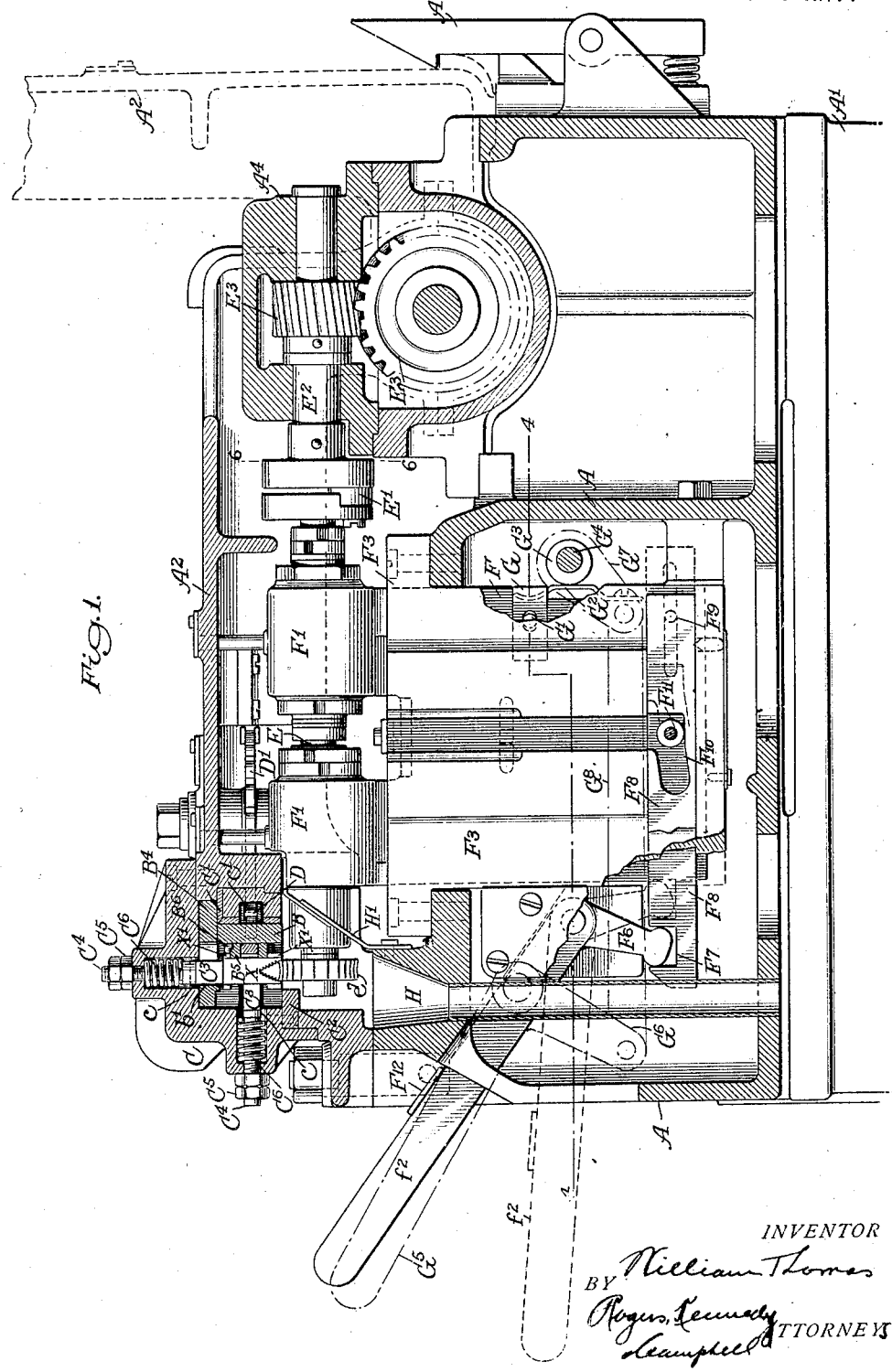

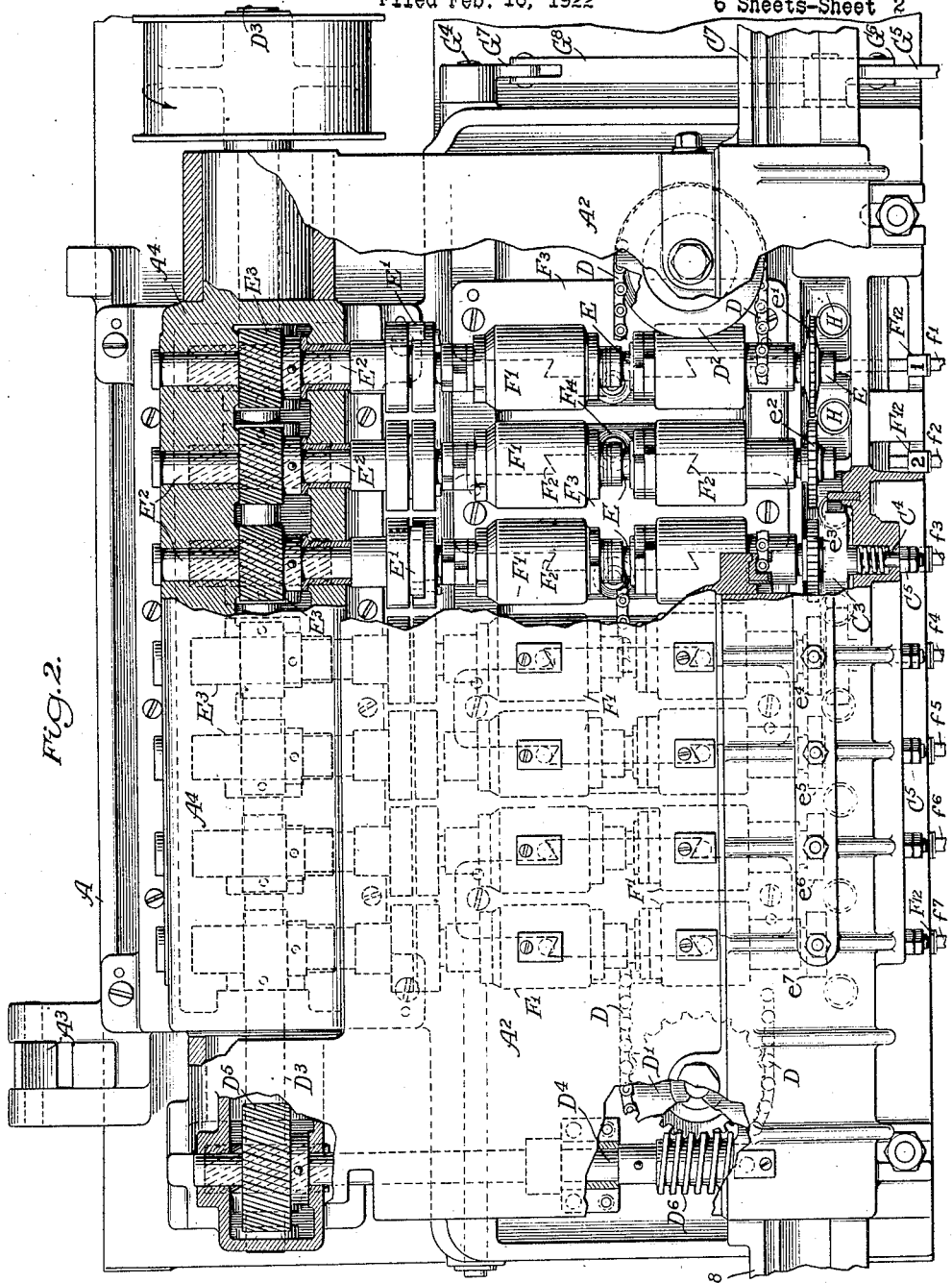

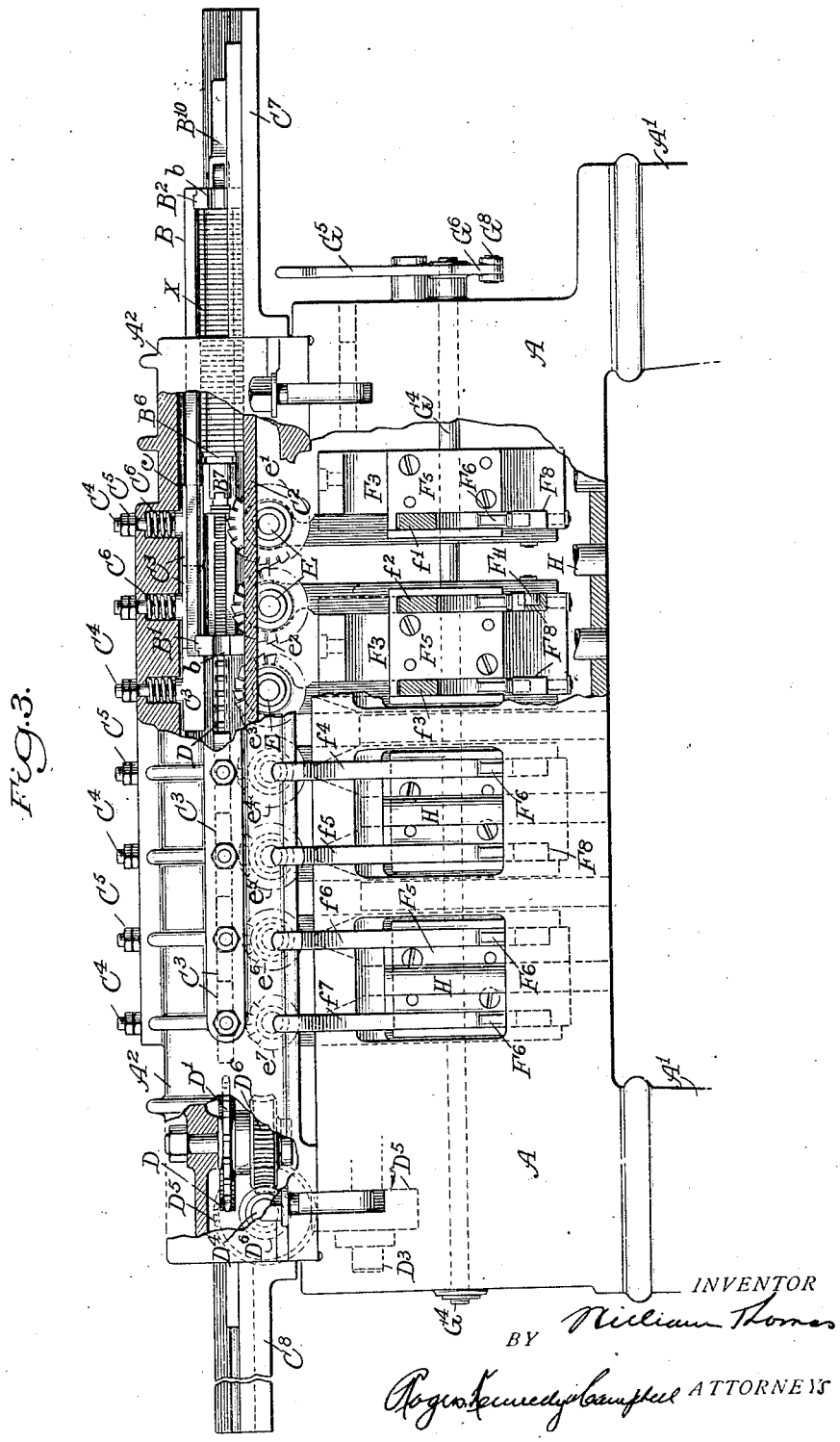

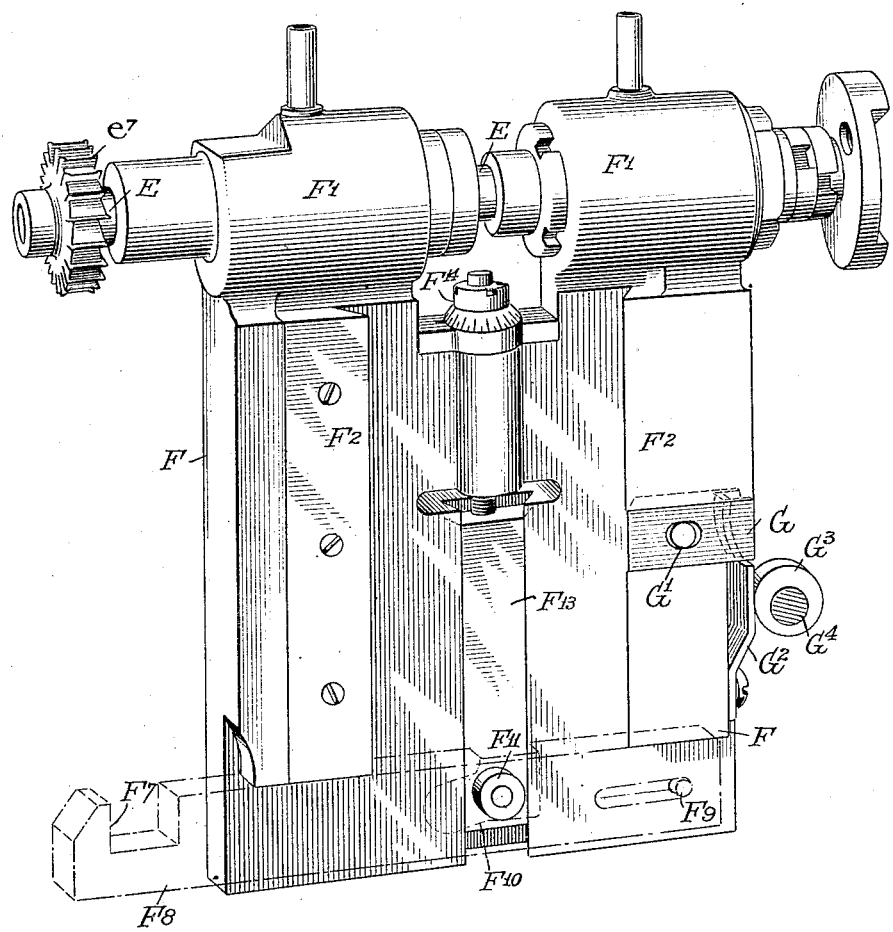

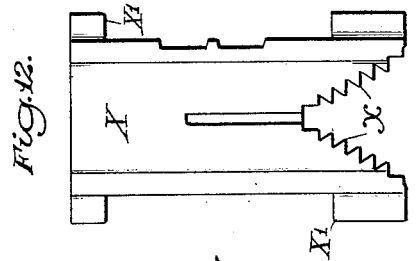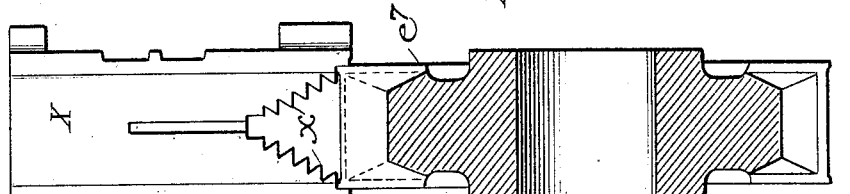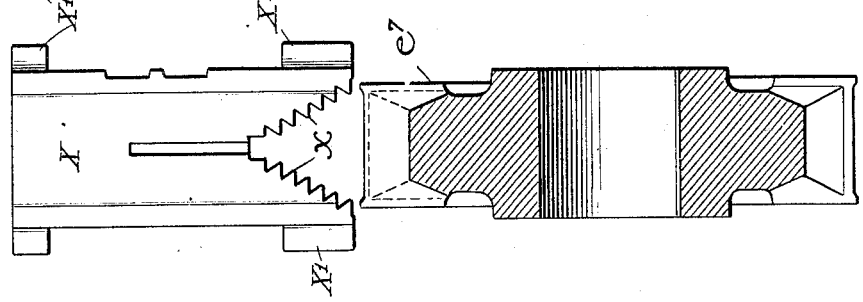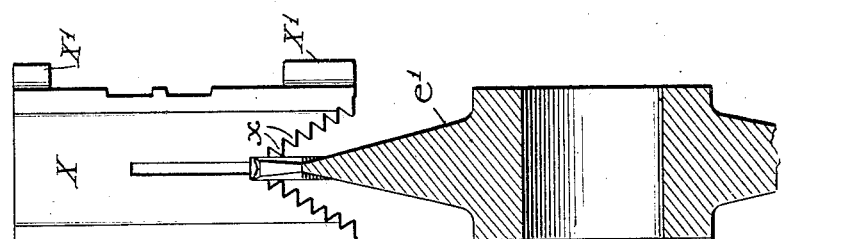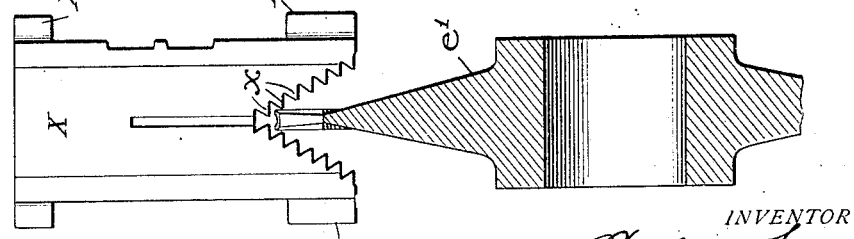

Patented Jan. 24, 1928.

1,657,328

UNITED STATES PATENT OFFICE.

WILLIAM THOMAS, OF BROOKLYN, NEW YORK, ASSIGNOR TO MERGENTHALER LINOTYPE COMPANY, A CORPORATION OF NEW YORK.

MACHINE FOR PRODUCING VARYING TOOTH COMBINATIONS ON TYPOGRAPHICAL ELEMENTS.

Application filed February 16, 1922. Serial No. 536,950.

This invention is directed to an improved form of machine for producing varying tooth combinations on typographical elements, such for instance as the matrices used in linotype machines. As is well known, these matrices are formed in their upper ends with sustaining teeth arranged on the opposite edges of V-shaped notches and which vary in number and location on different matrices to control their proper distribution according to character. In ordinary practise, the number of different tooth combinations may run as high as one-hundred twenty-six, this being about the largest number possible under the seven-tooth system now in general use.

In their manufacture, such matrices are usually stamped out with a full complement of teeth, that is to say, with seven teeth on each side of the V-notch, and then the particular combination desired is produced by the removal of such teeth as may be necessary. Heretofore, the removal of the teeth has been carried out in a milling machine equipped with a special stepped cutter taken from an assortment which comprises as many different cutters as there are tooth combinations to be cut, namely, one-hundred twenty-six. This old practise is very objectionable, not only because of the considerable expense involved in the preparation of the large number of special cutters required, but in addition by reason of annoyance and delay occasioned by the necessity for changing the cutters whenever a different tooth combination is to be cut.

The present invention is intended to obviate these and other objections and contemplates a machine which may be readily adjusted to produce any tooth combination desired, and this by the use of a few cutters only. The exact construction and operation of the parts will be fully pointed out in the detailed description to follow.

Referring to the drawings:

Fig. 1 is a vertical section taken through the machine from front to rear;

Fig. 2 is a top plan view, broken away in places to expose the interior construction;

Fig. 3 is a front elevation, also partly broken away;

Fig. 4 is a transverse section taken on the line 4—4 of Fig. 1;

Fig. 5 is a plan view of the holder in which the matrix elements are supported during their travel through the machine.

Fig. 6 is a section taken on the line 6—6 of Fig. 1, illustrating a form of coupling for the cutter spindles;

Fig. 7 is a detached perspective view of one of the cutters and its adjustable supporting slide;

Figs. 8 and 9 illustrate the relation between one of the cutters and a matrix element, the former figure showing the cutter out of action and the latter showing it in action.

Figs. 10 and 11 are views similar to Figs. 8 and 9 but taken in connection with a different cutter; and Fig. 12 shows the matrix element with a tooth combination produced by the combined action of the two said cutters.

In Fig. 8, there is illustrated a matrix element X such as the present machine is intended to treat. As shown, the element X is formed at one end with seven pairs of teeth $x$ (a full complement) arranged on the opposite edges of a V-shaped notch. In producing any given tooth combination, it is necessary to remove one or more of said pairs of teeth $x$ according to the nature of the combination. Thus, in one instance, the first pair of teeth (which for convenience will be taken as the pair located at the bottom of the V-notch), or any one of the other six pairs, will alone need to be removed, while, in other instances, two or more pairs of teeth must be removed. In short, any one or any group of the seven pairs of teeth may have to be removed in producing the desired combination.

In carrying out the foregoing operations, according to the present invention, the matrix elements are assembled at a common level in a suitable holder which is then carried through the machine along a horizontal guideway extended past a series of cutting means, in the present instance in the form of rotary face cutters, these latter being adjustably mounted so that any selected one or group thereof may be caused to act upon the traveling elements. There are seven such cutters, one for each pair of matrix teeth. The first cutter of the series, when in action, is designed to mill out the first pair of teeth, while the second, third, fourth, fifth, sixth and seventh cutters are designed to remove the other pairs of teeth in the order named, the cutters varying both in thickness and in diameter to accomplish these separate functions. It can be seen, therefore, that by the selective adjustment of the seven cutters, any desired one of the one hundred twenty six tooth combinations may be readily produced. By way of illustration, let it be assumed that it is desired to produce a tooth combination such as that shown in Fig. 12, which is made up of the second, third, fourth, fifth and sixth pairs of teeth. In such case, the first and last cutters ($e^1$ and $e^7$) of the series are employed, the former to remove the first pair of teeth and the latter the last pair. These two cutters normally occupy an inactive position, as shown in Figs. 8 and 10, but before the matrix elements are passed through the machine, they are raised to active position, as shown in Figs. 9 and 11, where they will mill off the two pairs of teeth as the elements are carried past them. It will be understood, of course, that during this period the other cutters are maintained or placed out of action, so as to leave the remaining pairs of teeth intact as required. The same procedure is followed in producing any tooth combination, the arrangement being such that any selected one or group of the cutters may be brought into action, and the others placed out of action, according to the tooth combination desired.

The machine will now be taken up in detail. Any suitable form of framework may be employed, that shown being in the form of a box-like structure or casing A wherein the various operative parts are enclosed and which is mounted upon supporting legs $A^1$. In order to give access to the interior, the top or cover section $A^2$ is pivoted at the rear so that it may be swung upwardly to the dotted line position shown in Fig. 1, where it may be held by a locking pawl $A^3$.

The holder for the matrix elements is shown in detail in Fig. 5. As will be noted, it is made up of a rear wall B, two end walls $B^1$ and $B^2$, and a top wall $B^3$, the latter overhanging the rear wall so as to provide in effect a supporting shelf or ledge $B^4$. On its front face, the wall B is formed with a pair of rails $B^5$ upon which the matrix elements X are sustained in inverted position within the holder, it being noted that these two rails have their outer faces arranged to engage the inner ends of projecting ears $X^1$ located at the opposite ends of the matrix elements. The holder is left entirely open at the front and bottom to permit the ready insertion and removal of the matrix elements, and for other reasons which will become apparent later on. Additional means are therefore provided for holding the elements within the holder, such means comprising a follower $B^6$ yieldingly mounted in a sliding block $B^7$ connected by tongue-and-groove connections to the sustaining rails $B^5$. The block $B^7$ carries a spring actuated detent $B^8$ adapted to cooperate with a toothed bar $B^9$ located in the space between the two rails $B^5$. Consequently, when a group of matrix elements has been assembled in the holder, the block $B^7$ is slid to the right until the follower $B^6$ is arrested by its engagement with the end element, when the detent $B^8$ snaps into one of the notches of the bar $B^9$ and holds the parts in their adjusted position. However, in order to apply a greater pressure to the assembled group of elements, the toothed bar $B^9$ has pivotally connected thereto at one end a cam lever $B^{10}$ arranged to bear against the outer face of the end wall $B^2$. The shape of the cam lever is such that when pulled forwardly to the position shown in Fig. 5, the toothed bar $B^9$ will be drawn to the right to apply pressure to the assembled group of elements, whereas when the cam lever is thrown rearwardly, the toothed bar will be allowed to move to the left to relieve such pressure, a spring $B^{11}$ being employed to effect such relieving movement of the bar.

The above holder is carried through the machine along a horizontal guideway or channel C formed in the top section $A^2$ of the frame and having two supporting ledges $C^1$ and $C^2$ upon which the holder is adapted to slide (Figs. 1 and 3). Within the guideway or channel C are located two series of resilient presser blocks $C^3$ arranged flush and end to end and providing continuous tracks along that portion of the guideway located above the cutters. The blocks in the front series are arranged to act upon the front edges of the matrix elements (the end walls $B^1$ and $B^2$ of the holder being formed with notches $b$ to clear said blocks), while those in the top series are arranged to act upon the upper ends of the matrix elements (the top wall $B^3$ of the holder being formed with a through-slot $b^1$ for such purpose). As thus arranged, the presser blocks act to insure the proper alignment of the matrix elements during the milling operation. Each of the presser blocks is attached to a screw-threaded pin $C^4$ having at its outer end an adjusting nut $C^5$ bearing against the exterior face of the casing. Encircling the pin $C^4$ is a spring $C^6$ tending constantly to press the block into the guide-channel as far as the adjusting nut will permit. Obviously, by tightening or loosening the nuts $C^5$, the position and pressure of the various blocks may be varied as desired. The rear edges of the blocks fit in grooves $c$ of the guideway and are thus held against turning.

In the present instance, the matrix holder is carried through the machine from right to left by an endless sprocket chain D, passing around sprocket wheels $D^1$ and $D^2$, journaled in suitable bearings in the top section $A^2$ of the frame. The chain is driven continuously from a main drive shaft $D^3$ (receiving power from any suitable source) through the medium of a fore-and-aft shaft $D^4$ journaled in bearings at the left. At its rear end, the shaft $D^4$ is connected to the drive shaft $D^3$ by spiral gearing $D^5$, and at its forward end to the sprocket wheel $D^1$ by worm gearing $D^6$. As shown in Figs. 1 and 3, the sprocket chain is arranged directly alongside the channel or guideway C, its forward stretch running in a groove $c^1$ formed in the rear wall of the channel. This arrangement enables the chain to pick up the holder, when the latter is inserted in the guideway, and transport it through the machine. To permit such action of the chain, the holder is provided at the rear (Fig. 5) with a pair of spring-actuated pawls $B^{12}$ located in recesses $B^{13}$ and formed with projecting noses $B^{14}$, which latter present straight shouldered portions at one side and inclined portions at the other side. The pawls are also formed with lugs $B^{15}$ which by their engagement with abutments $B^{16}$, serve to limit the outward movement of the pawls under the influence of their actuating springs. It will be clear from the drawings, without further explanation, that when the holder is pushed into the guideway, the pawls $B^{12}$ automatically connect the holder to the sprocket chain and maintain such connection until the holder leaves the guideway, when of course the connection is automatically broken. To facilitate the handling of the holder, the machine is provided at the right with a feed-table $C^7$ designed to guide the holder accurately into the guideway and at the left with a receiving table $C^8$ onto which the holder is discharged as it leaves the guideway.

As previously noted, the machine is provided with seven distinct cutting means in the form of rotary face cutters, designated $e^1$ to $e^7$, respectively, (Figs. 2 and 3). While they might be disposed in concentric or some other suitable relation, the several cutters are preferably arranged (as shown) one behind another in gang or series and with their axes of rotation disposed normally in a horizontal plane. It will be observed that the cutters vary from one another both in thickness and in diameter, the first cutter $e^1$ being of the least thickness and of the greatest diameter, and the last cutter $e^7$ being of the greatest thickness and of the least diameter (see Figs. 8 to 11). As thus constructed and arranged, the cutters are enabled to operate at different levels and in different vertical planes in removing their differently located pairs of teeth in the manner before mentioned. The several cutters are fixed to the forward ends of operating spindles E connected by flexible couplings, such as the pivoted links $E^1$ (Fig. 6), to aligned stub-shafts $E^2$, which latter are driven through spiral gearing $E^3$ from the continuously operated drive-shaft $D^3$, before referred to. The stub-shafts $E^2$ and the common drive-shaft $D^3$ are all mounted for rotation in a stationary two-part case or housing $A^4$, whereas the operating spindles E are mounted in bearings $F^1$ carried by independent vertically adjustable slides F, (see Fig. 7). It will be seen, therefore, that the various cutters are rotated continuously whether they are in action or out of action, this being permitted of course by the pivoted links $E^1$ which maintain the connection between the cutters and the main drive shaft at all times.

In the embodiment illustrated, the adjustable slides F (Fig. 4) are connected by wide centrally located dove-tails $F^2$ to upright posts or standards $F^3$ firmly secured in the framework. To save space, each standard, with the exception of the first (the one to the right), is made common to two of the adjustable slides. As thus mounted, any selected one or any selected group of cutters may be placed in or out of action by the raising or lowering of the corresponding slide or slides F, as the case may be. For effecting such adjustment of the slides, there is provided a series of hand levers, one for each cutter, designated $f^1$ to $f^7$, respectively (Figs. 1 and 2). These hand levers are arranged side by side at the front of the machine and pivotally mounted upon supporting pins $F^4$ (Fig. 4) projecting laterally from blocks $F^5$ attached to the corresponding standards $F^3$. At their lower ends (Fig. 1), the hand levers are provided with downwardly projecting arms $F^6$ engaging in notches $F^7$ of a corresponding series of actuating slides $F^8$. The actuating slides $F^8$ are also mounted on the standards $F^3$ and are held in place thereon by pin-and-slot devices $F^9$, which serve in addition to limit the movement of the slides in opposite directions. At points intermediate their ends, the slides $F^8$ are formed with open cam grooves $F^{10}$ cooperating with pins or rollers $F^{11}$ carried by the adjustable slides F, the arrangement being such that the forward and backward movements of the actuating slides will effect the positive raising and lowering of the slides. These forward and backward movements of the actuating slides follow, of course, from the raising and lowering of the hand levers, so that an operator will simply need to know that the movement of any particular hand lever upwardly or downwardly will result in a corresponding movement of the connected cutter. In practise, the hand levers are provided with numbered plates or labels $F^{12}$ (Fig. 2) to serve as a guide in the selection of the cutters.

The proper action of the cutters will depend to a large extend upon the accuracy of adjustment of each of their supporting slides. For this reason, each roller $F^{11}$, instead of being attached directly to the corresponding slide F, is mounted upon a supplemental slide $F^{13}$ (Fig. 7) carried by the slide F and adjustable upwardly and downwardly thereon by a regulating screw $F^{14}$ having an indicating scale associated therewith. In this way, any disarrangement of the parts through faulty manufacture, wear or for other reasons, may be fully compensated for by the regulating device. In order to prevent any chattering or vibration of the parts during the action of the cutters, means are additionally provided to hold the adjustable slides F firmly and securely in their active positions. Such means, in the present instance, comprise a series of friction blocks G connected by pin-and-slot devices $G^1$ to the respective slides F, and having their forward ends beveled to cooperate with the rear edges of the dove-tail tongues $F^2$ of the standards $F^3$ (see particularly Figs. 4 and 7). At their rear ends, the blocks G are recessed to receive the free ends of centrally offset blade springs $G^2$ also attached to the slides F. These springs are arranged in position to be acted upon by a series of cams or eccentrics $G^3$ fixed upon a rock-shaft $G^4$ journaled in the frame-work and connected at the right, outside of the casing (Figs. 2 and 3), to a hand lever $G^5$ through the medium of arms $G^6$ and $G^7$ and a connecting link $G^8$. According to this arrangement, when the hand lever $G^5$ is depressed, the eccentrics $G^3$ are turned rearwardly to disengage the springs $G^2$, whereas when the hand lever is raised, the eccentrics are turned forwardly to engage said springs and through them press the blocks G into engagement with the dove-tail tongues, the pressure being sufficient to hold the slides firmly and securely in their adjusted position, whether active or inactive.

In the operation of the machine, considerable waste material will result from the cutting action, and means are therefore provided to receive and carry off such waste material as it is produced. As a simple arrangement for this purpose, there is provided (Figs. 1 to 3) a series of funnel-shaped tubes or receptacles H (eight in all) arranged beneath the cutters in position to receive the waste material and carry it out of the machine. As best shown in Fig. 2, the receiving mouths of the tubes are arranged side by side in close proximity to one another and thus conjointly provide in effect a trough extending beneath the whole series of cutters. If desired, a guard plate $H^1$ (Fig. 1) may be arranged back of the cutters to prevent the waste particles from finding their way into the operative parts at the rear.

The operation of the machine will have been understood from the foregoing description, but a brief recapitulation may be helpful. Assuming, as before, that it is desired to produce on the matrices a tooth combination like that shown in Fig. 12, the operator brings into action the first and last cutters of the series, namely $e^1$ and $e^7$, and places the remaining cutters out of action. This is done (if need be) by raising hand levers Nos. 1 and 7 and depressing all of the others. Before operating the selecting levers, however, the hand lever $G^5$ is depressed so as to relieve the pressure on the friction blocks G and thus to permit the free adjustment of the supporting slides F. Then, after the operation of the selecting levers, the locking lever $G^5$ is again raised to restore pressure to such of the friction blocks G as are associated with the active or raised slides F so as to hold the latter firmly in their adjusted position. The machine is now ready to act upon the matrix elements, it being remembered that the various cutters as well as the sprocket chain D are constantly driven from the main shaft $D^3$. The operator, therefore, has merely to insert the matrix holder into the guideway C at the right (this being facilitated by the feed table $C^7$), whereupon the traveling chain picks up the holder and carries it through the machine, finally depositing it upon the receiving table $C^8$ located at the left. As the holder is carried along the guideway, the matrix elements are presented to the rotary cutters in succession, it being again remembered that the parts are so constructed that the toothed portions of said elements are exposed to the action of the cutters during the travel of the holder (see Fig. 1). In the above illustration, all of the cutters, with the exception of the first and the last, are placed out of action, and hence do not act upon the blanks. The two excepted cutters $e^1$ and $e^7$, on the other hand, being the active ones, intercept the paths traversed by the first and seventh pairs of matrix teeth $x$ as illustrated in Figs. 9 and 11, and hence mill off these two pairs of teeth one after the other, the cutter $e^1$ acting first to remove the pair of matrix teeth located at the higher level or at the narrowest part of the V-notch, and the cutter $e^7$ acting next to remove the pair of teeth located at the lower level or at the widest part of the V-notch. One holder after another is thus sent through the machine until the requisite number of matrix elements has been treated. In practise, the holders are brought to the machine with the matrix elements already assembled therein and ready to be treated, so that the machine is kept in continuous operation. When matrices with other combinations are to be produced, the machine is adjusted in a similar way to select the proper cutters. As previously explained, the machine can be instantly adjusted to produce any desired one of the one hundred twenty six possible tooth combinations.

While the machine herein illustrated and described has been found in practise to be entirely satisfactory for the purpose intended, it will be obvious that many changes and alterations may be made therein and still be comprised within the spirit of the invention. Thus, the details of the matrix holder and its guideway, or of the conveyor mechanism, or of the cutters and their adjusting devices, may be variously modified by the skilled mechanic without affecting the underlying principle of operation. It should be understood, therefore, that the invention is not limited to any specific form or arrangement of the parts except in so far as such limitations are specified in the appended claims.

Having thus described my invention, its construction and mode of operation, what I claim is as follows:

1. In a machine for removing from unfinished typographical elements, sustaining teeth located in pairs in different definite zones, in order to produce varying tooth combinations on said elements, the combination of a series of cutting means, one for each pair of teeth in a definite zone and operative only in that zone, and means whereby any selected one or group of said cutting means may be caused to act, each in its own zone on both of the teeth of the pair therein, to the exclusion of the other cutting means, according to the tooth combination desired.

2. In a machine for producing varying tooth combinations on typographical elements, the combination of a series of rotary cutters varying both in thickness and diameter, and means whereby the typographical elements may be subjected to the action of any selected one or group of said cutters according to the tooth combination desired.

3. In a machine for removing from unfinished typographical elements, sustaining teeth located in pairs in different definite zones, in order to produce varying tooth combinations on said elements, the combination of a series of cutting means, one for each pair of teeth in a definite zone and operative only in that zone, said cutting means being adjustably mounted so that any selected one or group thereof may be brought into action to the exclusion of the others, each in its own zone to act on both of the teeth of the pair therein, and means for presenting said typographical elements to the action of the selected cutting means, with the sustaining teeth of the respective elements disposed in alignment with each other.

4. In a machine for producing varying tooth combinations on typographical elements, the combination of means for transporting said elements through the machine at a common level, and a series of rotary cutters arranged one behind another along the path of travel of the elements and having their axes of rotation disposed in a horizontal plane, the said cutters being of varying diameter and adjustably mounted so that any selected one or group thereof may be caused to act upon said elements according to the tooth combination desired.

5. In a machine for producing varying tooth combinations on typographical elements, the combination of means for transporting said elements through the machine at a common level, and a series of rotary cutters arranged one behind another along the path of travel of the elements and having their axes of rotation disposed in a horizontal plane, the said cutters being of varying thickness and diameter and adjustably mounted so that any selected one or group thereof may be caused to act upon said elements according to the tooth combination desired.

6. In a machine for producing varying tooth combinations on typographical elements, the combination of a series of cutters adjustably mounted so that any selected one or group thereof may be brought into action, a guideway extended past the cutters, a holder wherein the typographical elements are supported, an endless conveyor for carrying said holder along the guideway to present the contained elements to the action of the selected cutter or cutters, and driving means for said conveyor.

7. In a machine for producing varying tooth combinations on typographical elements, the combination of a series of cutters adjustably mounted so that any selected one or group thereof may be brought into action, a guideway extended past the cutters, an endless conveyor disposed alongside said guideway, means for driving said conveyor continuously, an independent holder wherein the typographical elements are supported and adapted to be placed on the guideway, and connecting devices formed partly on the holder and partly on the conveyor and arranged to be automatically engaged and disengaged at the beginning and end of travel of the holder along the guideway.

8. In a machine for producing varying tooth combinations on typographical elements having sustaining teeth, the combination of a series of cutters adjustably mounted so that any selected one or group thereof may be moved upwardly into action, a guideway arranged above the cutters and extending horizontally from one end of the machine to the other, and a holder adapted to support the typographical elements bottom side up and slidable along the guideway, the said holder being entirely open at its lower side to enable the selected cutter or cutters to act upon the toothed portions of the contained elements during their travel through the machine.

9. In a machine for producing varying tooth combinations on typographical elements, the combination of a series of cutters adjustably mounted so that any selected one or group thereof may be brought into action, a guideway extended past the cutters, a holder slidable along said guideway to present the contained typographical elements to the action of the selected cutter or cutters, and resilient presser devices arranged along the guideway in position to act directly upon the matrices in the holder to insure their proper alignment during the cutting action.

10. In a machine for producing varying tooth combinations on typographical elements, the combination of a series of cutters adjustably mounted so that any selected one or group thereof may be brought into action, a horizontal guideway arranged above and extended past the cutters, a holder for the typographical elements slidable along the guideway and open at the front, top and bottom, respectively, and resilient presser devices arranged along the front and top of the guideway in position to act through the holder directly upon the contained elements to insure their proper alignment during the cutting action.

11. In a machine for producing varying tooth combinations on typographical elements, the combination of a series of cutters adjustably mounted so that any selected one or group thereof may be brought into action, a guideway arranged above the cutters and extending horizontally from one end of the machine to the other, a holder slidable along said guideway and open at its lower side to expose the typographical elements therein to the action of the selected cutter or cutters, and a series of waste receptacles underlying the cutters.

12. In a machine for producing varying tooth combinations on typographical elements, the combination of a series of cutters, independently adjustable slides whereon the cutters are mounted, and means for effecting the required adjustment of the slides, the said means including a series of hand levers, one for each cutter, and operative connections between each hand lever and the corresponding slide.

13. In a machine for producing varying tooth combinations on typographical elements, the combination of a series of cutters, independently adjustable slides whereon the cutters are mounted, and means for effecting the required adjustment of the slides, the said means including a series of hand levers, one for each cutter, and a corresponding series of actuating slides operatively connected with the hand levers and the cutter slides, respectively.

14. In a machine for producing varying tooth combinations on typographical elements, the combination of a series of cutters, independently adjustable slides whereon the cutters are mounted, a series of hand levers, one for each cutter, and operative connections between each hand lever and the corresponding cutter slide, said connections including a device for regulating the extent of adjustment of the slide.

15. In a machine for producing varying tooth combinations on typographical elements, the combination of a series of cutters, independently adjustable slides whereon the cutters are mounted, and means for effecting the adjustment of said slides to bring any selected one or group of the cutters into action as required, the said means including compensating devices for regulating the extent of adjustment of the individual slides.

16. In a machine for producing varying tooth combinations on typographical elements, the combination of a series of cutters, a corresponding series of supporting slides, each adjustable independently to active or inactive position as required, means for effecting the required adjustment of the slides, and means independent of the adjusting means for holding the active slide or slides firmly and securely in adjusted position.

17. In a machine for producing varying tooth combinations on typographical elements, the combination of a series of cutters, a corresponding series of supporting slides, each adjustable independently to active or inactive position as required, means for effecting the required adjustment of the slides, and means for exerting a clamping pressure upon the active slide or slides to hold the same firmly and securely in adjusted position.

18. In a machine for producing varying tooth combinations on typographical elements, the combination of a series of cutters, a corresponding series of supporting slides, each adjustable independently to active or inactive position as required, means for effecting the required adjustment of the slides, and means for exerting a clamping pressure upon the active slide or slides to hold the same firmly and securely in adjusted position, the said means including a series of friction blocks, one for each slide, and a common hand lever for controlling the operation of said blocks.

19. In a machine for producing varying tooth combinations on typographical elements, the combination of a series of cutters, a corresponding series of supporting slides, each adjustable independently to active or inactive position as required, means for effecting the required adjustment of the slides, and means for exerting a clamping pressure upon the active slide or slides to hold the same firmly and securely in adjusted position, the said means including a series of friction blocks, one for each slide, cams or eccentrics arranged in cooperative relation to said blocks, and intermediate springs through which said cams or eccentrics act upon the friction blocks.

20. In a machine for producing varying tooth combinations on typographical elements, the combination of a series of rotary cutters, adjustable supporting slides whereon the cutters are mounted, and driving means for the cutters, said means including a common drive shaft journalled in the machine frame, operating spindles journalled in the adjustable supporting slides, and intermediate flexible connections permitting the adjustment of the supporting slides without affecting the driving connections.

21. In a machine for producing varying tooth combinations on typographical elements, the combination of a series of rotary cutters, driving means therefor including operating spindles, one for each cutter, journaled in adjustable supporting slides, stub shafts aligned with said operating spindles and journaled in the fixed machine frame, and flexible connections between the operating spindles and stub shafts permitting relative adjustment of said parts without affecting the driving connections.

In testimony whereof, I have affixed my signature hereto.

WILLIAM THOMAS.